United States Patent [19]

Levivier

[11] Patent Number: 5,094,492
[45] Date of Patent: Mar. 10, 1992

[54] CONNECTOR FOR SMOOTH PIPES

[76] Inventor: Yves Levivier, 6, Rue David Desvachez, 59300 Valenciennes, France

[21] Appl. No.: 687,212

[22] Filed: Apr. 18, 1991

Related U.S. Application Data

[63] Continuation of Ser. No. 402,661, Sep. 5, 1989, abandoned.

[30] Foreign Application Priority Data

Sep. 9, 1988 [FR] France .................. 88 11810

[51] Int. Cl.⁵ .......................... F16L 17/04
[52] U.S. Cl. .................. 285/104; 285/112; 285/175; 285/302; 285/373; 285/340
[58] Field of Search ........... 285/104, 340, 305, 320, 285/112, 175, 373, 302

[56] References Cited

U.S. PATENT DOCUMENTS

| | | | |
|---|---|---|---|
| 1,789,379 | 1/1931 | Dillon | 285/104 |
| 2,177,184 | 11/1939 | Martin et al. | 285/104 X |
| 2,283,975 | 5/1942 | Dillon | 285/104 |
| 2,346,051 | 4/1944 | Seamark | 285/104 |
| 2,424,542 | 7/1947 | Adams, Jr. | 285/104 |
| 2,459,251 | 1/1949 | Stillwagon | 285/104 |
| 2,473,046 | 6/1949 | Adams, Jr. | 285/104 X |
| 2,479,960 | 8/1949 | Osborn | 285/104 |
| 3,024,046 | 5/1958 | Frost et al. | 285/104 |
| 4,109,942 | 8/1978 | Morrill | 285/340 X |
| 4,508,466 | 4/1985 | Dennis | 285/340 X |
| 4,842,306 | 6/1989 | Zeidler | 285/340 X |

FOREIGN PATENT DOCUMENTS 0658314 12/1963 Italy .................. 285/104

Primary Examiner—Dave W. Arola
Attorney, Agent, or Firm—Levy, Zito & Grandinetti

[57] ABSTRACT

A connector for smooth pipes characterized by having one of the ends of the sleeve (3) equipped with a peripheral housing (4) receiving locking rings for fixing the connector securely on one end (1) only of one of the pipes to be connected, the end of the other pipe (2) being able to slide freely in the sleeve (3) while being in contact only with the corresponding lip (15) of the joint (13).

2 Claims, 1 Drawing Sheet

CONNECTOR FOR SMOOTH PIPES

This application is a continuation of application Ser. No. 402,661, filed on Sept. 5, 1989, now abandoned.

The invention relates to a connector for smooth pipes receiving a pressurized fluid, which connector is fixed on the end of two pipes by gripping, without welding or screwing, the connector comprising an outer sleeve forming a chamber receiving a seal in the form of a tube terminating in a lip pressing in a leakproof manner against a corresponding pipe end through the action of the pressure of the fluid circulating in the pipes, locking rings housed in the sleeve for locking against the pipes, and a gripping means of the sleeve for locking the connector on the pipes.

Such a connector is known in various embodiments and it is, in particular, described in Patents FR 77 222 80 and FR 77 224 18.

The known connectors of this type comprise an outer sleeve forming a chamber receiving a seal in the form of a tube terminating at each end in a lip pressing in a leakproof manner against one pipe end, and inner springs through the action of the pressure of the fluid circulating in the pipes. At each end, a locking ring is provided. The two rings which are each located respectively at one end of the sleeve and press against the sleeve engage via their locking elements in the corresponding end of the two pipes to be connected, the locking elements of the two rings acting in opposite directions. In these conditions, each pipe end can make only a movement into the connector, whereas the movement in the opposite direction is prevented by the locking elements. Such connectors are advantageous because they make it possible to easily connect pipes in a detachable manner, but one of their drawbacks lies in the fact that this type of connector does not enable the effects of the expansion of the pipes to be absorbed.

The present invention aims to remedy the drawbacks of the known solutions and proposes the creation of a connector which is simple to manufacture and fit, and which enables the effects of expansion of the pipes to be absorbed.

To this end, the invention concerns a connector of the above type characterized in that one of the ends of the sleeve is equipped with a peripheral housing for receiving a locking means for fixing the connector securely on one end only of one of the pipes to be connected, the end of the other pipe being able to slide freely in the sleeve while being in contact only with the corresponding lip of the joint.

According to a characteristic, one of the ends of the outer sleeve of the connector comprises the locking rings acting in opposite directions.

This therefore provides a fixed point formed by an attachment which is secure but detachable from the connector on the end of one of the pipes, whereas the end of the other pipe penetrates freely into the connector, being subject only to the action of the leakproof lip of the sleeve. Regardless of the pressure of the fluid in the conduit, this lip permits the axial sliding of the end of the corresponding pipe and, consequently, permits the phenomena of expansion and contraction through the action of variations in ambient temperature or in fluid circulating in the pipes to be taken into account.

In a particularly advantageous manner, the sleeve has the form of two shells connected via bolts.

According to a characteristic of the invention, the peripheral housing has a trapezoidal section.

The joint according to the invention tolerates vibrations and pressures ranging up to 40 bars. Its bulk is extremely small. With suitable dimensions, it is used on any piping and is rapidly installed. No preparation of the ends of the pipes is necessary and it also makes it possible to absorb a certain angular or parallax staggering of the end of the pipes.

The present invention will be described in more detail with the aid of the appended drawings, in which.

Figure 1:
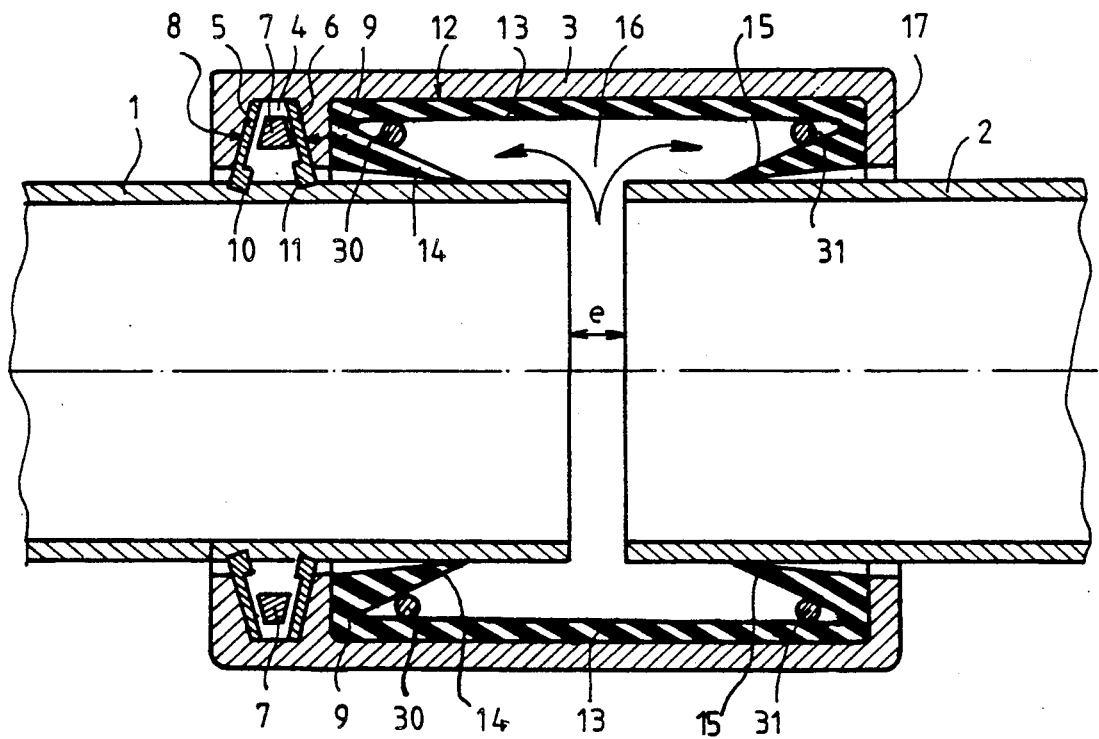
FIG. 1 is a sectional view of two pipe ends connected by a connector according to the invention.

According to FIG. 1, the connector of the invention is intended to connect two ends 1 and 2 of two pipes. The ends of the two pipes 1, 2 have intentionally not been shown as contiguous, but separated by a distance which can vary as a function, for example, of the expansion or of the contraction of the pipes.

This connector is composed of an outer sleeve finishing at one of its ends, for example the left hand end, in a peripheral housing 4 receiving a locking means such as two open locking rings 5 and 6. In this embodiment, the two rings are separated by an open retaining ring 7 of trapezoidal or circular section, the walls 8 and 9 of the peripheral housing 4 themselves being inclined, the section of the housing being trapezoidal.

Thus, the rings 5 and 6 are held, on assembly, in an opposing, inclined position, by virtue of the open retaining ring 7, on the walls 8 and 9. These walls (8, 9) define part of a locking means.

Although, in certain cases, the simplest embodiment of the locking means is an assembly of two rings with opposite action, it is also possible to provide a solid locking ring acting in both directions of relative translation of the pipe and of the connector. This ring is split in order to yield resiliently when the connector is gripping.

In the case of the rings, in order to permit gripping on the pipe, these open rings are finished at the bottom by sharp edges 10, 11, forming locking elements. These edges are intended to be embedded in the wall of the end of the pipe 1 upon axial gripping of the sleeve 3.

Next to the peripheral housing 4, the outer sleeve 3 is equipped with a peripheral housing 12 of a certain axial length containing a joint 13 formed from a resilient sleeve finishing at each end in lips 14, 15. One of the lips 14, 15 presses on the end of the pipe 1, the other lip pressing on the end of the pipe 2. Inside this joint, there is a cavity 16 in which the pressurized fluid circulating in the pipes 1, 2 arrives. Through the action of the pressure, the resilient sleeve and the lips 14, 15 of the joint 13 are pressed, one against the sleeve 3 and the others against the ends of the pipes 1, 2, thus providing the leakproof seal.

In the right hand part according to FIG. 1, the outer sleeve 3 ends in an angle section 17 which acts as a support for the right hand part of the joint 13, the contour of the annular housing 4 acting as a support on the left hand side for the joint 13.

As this connector has only one point (or double peripheral line) of secure attachment, for example, on the pipe 1, the end of the connector which is located at the level of the pipe 2 fulfills only a sealing function but not a locking function. The pipes 1, 2 can therefore come closer together or separate from one another as a function of the expansions or contractions created by the variations in temperature of the fluid or in the ambient temperature.

Thus the connector provides, in a simple manner, not only a leakproof seal between two pipe ends, but also makes it possible to absorb expansions.

According to the invention, the sleeve 3, like the locking rings (5, 6) and the retaining ring 7 are open peripheral members, that is to say noncontinuous so as to permit the radial compression of the sleeve 3, for example by bolts, in order to ensure embedding of the locking rings (5, 6) in the end 1 of the pipe and consequently the locking of the connector on this pipe end.

Figure 2:
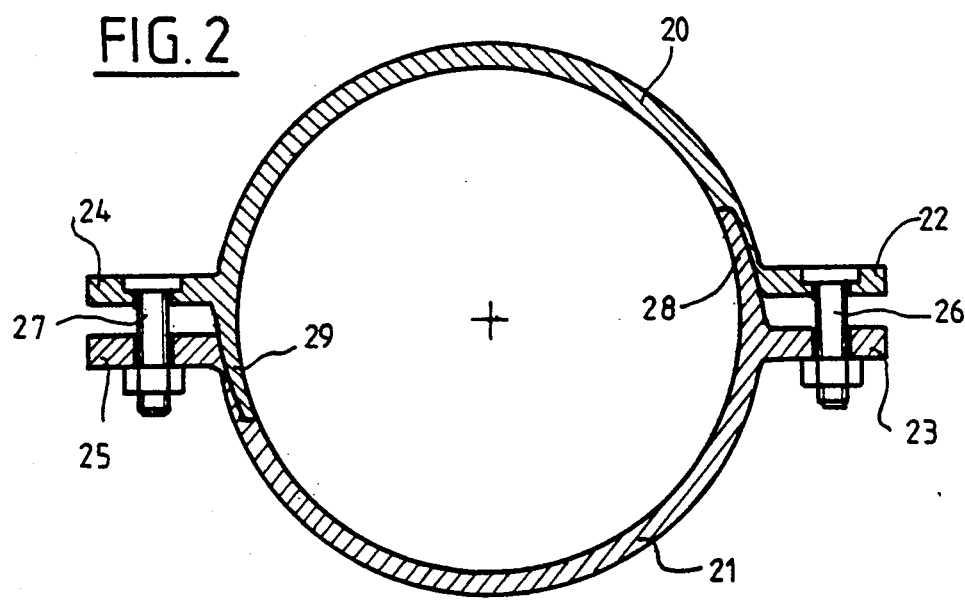
FIG. 2 is a view in axial section of an illustrative embodiment of the outer sleeve in two parts, in the manner of a collar.

FIG. 2 shows, in section, an alternative embodiment of the outer sleeve. This sleeve consists of two parts 20, 21 finishing at each end in lugs 22, 23 and 24, 25 connected by bolts 26, 27. In order to avoid the resilient joint escaping into the gap between the lugs 22, 23 and 24, 25 of the two parts of the outer sleeve, each part 20, 21 finishes in a guide surface 28, 29 interacting with the corresponding guide surfaces (not shown) of the other part in order to provide a certain continuity at the junction of the two parts 20, 21 closing the gap between the lugs 22, 23 and 24, 25.

However, other embodiments of the outer sleeve may be envisaged. This sleeve may also be produced in two parts articulated to one another via a hinge and whose other ends are connected via gripping bolts.

It should be noted that the connector according to the invention has a particularly simple and lightweight construction. It makes it possible to absorb expansions. According to the length of the connector and its embodiment it will be fixed via the gripping of two or four bolts.

I claim:

1. Connector for smooth pipes receiving a pressurized fluid, which connector is fixed on the end of one pipe by gripping, and wherein the connector receives freely the end of the other pipe, the connector comprising:

an outer sleeve forming a chamber receiving a seal defining a joint in the form of a resilient sleeve terminating at each end in a lip pressing in a leak proof manner at the end of each pipe through the action of the pressure of the fluid in the pipes, the outer sleeve forming also a peripheral housing receiving a locking means consisting of two loose open rings, and means in said housing and open rings to position said rings in opposing inclined positions within said peripheral housing, said two loose open rings embed and apply opposite action for affixing the connector securely on one end only of one of the pipes to be connected, the end of the other pipe being able to slide freely in the sleeve while being in contact only with the corresponding lip of the joint.

2. Connector according to claim 1, wherein said means to position said rings includes oppositely inclined walls and a third loose open ring member positioned between said two loose open rings, said third loose open ring member retains each of said two loose open rings against its respective inclined wall of said peripheral housing.

* * * * *